United States Patent
Scott et al.

(10) Patent No.: US 10,108,467 B2
(45) Date of Patent: Oct. 23, 2018

(54) DATA PROCESSING SYSTEM WITH SPECULATIVE FETCHING

(71) Applicant: FREESCALE SEMICONDUCTOR, INC., Austin, TX (US)

(72) Inventors: Jeffrey W. Scott, Austin, TX (US); William C. Moyer, Dripping Springs, TX (US); Quyen Pho, Pflugerville, TX (US)

(73) Assignee: NXP USA, Inc., Austin, TX (US)

( * ) Notice: Subject to any disclaimer, the term of this patent is extended or adjusted under 35 U.S.C. 154(b) by 383 days.

(21) Appl. No.: 14/695,633

(22) Filed: Apr. 24, 2015

(65) Prior Publication Data
US 2016/0313994 A1    Oct. 27, 2016

(51) Int. Cl.
| G06F 3/00 | (2006.01) |
|---|---|
| G06F 9/52 | (2006.01) |
| G06F 12/0875 | (2016.01) |
| G06F 12/0862 | (2016.01) |
| G06F 9/38 | (2018.01) |
| G06F 13/38 | (2006.01) |

(52) U.S. Cl.
CPC .......... *G06F 9/528* (2013.01); *G06F 9/3802* (2013.01); *G06F 9/3804* (2013.01); *G06F 9/3861* (2013.01); *G06F 12/0862* (2013.01); *G06F 12/0875* (2013.01); *G06F 2212/452* (2013.01); *G06F 2212/6028* (2013.01)

(58) Field of Classification Search
None
See application file for complete search history.

(56) References Cited

U.S. PATENT DOCUMENTS

| 5,774,685 | A | 6/1998 | Dubey | |
|---|---|---|---|---|
| 6,073,230 | A | 6/2000 | Pickett et al. | |
| 6,092,186 | A | 7/2000 | Betker et al. | |
| 7,877,577 | B2 | 1/2011 | Fukazawa | |
| 8,156,286 | B2 | 4/2012 | Deneau | |
| 2010/0169611 | A1* | 7/2010 | Chou | G06F 9/3844 712/205 |
| 2014/0201472 | A1* | 7/2014 | Joshua | G06F 12/0813 711/151 |
| 2016/0019149 | A1* | 1/2016 | Sivaramakrishnan | G06F 12/0811 711/122 |

* cited by examiner

*Primary Examiner* — Scott Sun

(57) ABSTRACT

A data processing system includes an instruction pipeline, a bus interface unit, and a cache. The instruction pipeline is configured to assert a discard signal when a speculative read request is determined to have been mispredicted. The speculative read request has a corresponding access address. The bus interface unit is configured to communicate with an external system interconnect. The cache includes a cache array and cache control circuitry. The cache control circuitry is configured to receive the discard signal from the instruction pipeline and, when the discard signal is asserted after the access address has been provided to the external system interconnect by the bus interface unit in response to a determination by the cache control circuitry that the access address missed in the cache array, selectively store the read information returned from the access address into the cache array.

19 Claims, 5 Drawing Sheets

PATENT NO: US 10,108,467 B2

DATA PROCESSING SYSTEM WITH SPECULATIVE FETCHING

BACKGROUND

Field

This disclosure relates generally to data processing systems, and more specifically, to data processing systems which utilize speculative fetching.

Related Art

Speculative instruction fetching is often used to increase performance of a processor by fetching instructions that may or may not be used later. These fetches usually occur early in the processor pipeline such that if those instructions are later determined to be needed by the processor, they are immediately available, thus increasing performance. However, there are times when after fetches have been initiated down a speculative path, it is determined, later in the processor pipeline, that those fetches are no longer needed. Furthermore, if any of those fetches which are no longer needed resulted in an instruction cache miss, the processor may be stalled waiting for those accesses to complete before the processor can recover and continue fetching down the correct path.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

In a data processing system, a discard signal provided by the central processing unit (CPU) allows the CPU to signal the cache and bus interface unit (BIU) that a speculative fetch is no longer needed. This signal results in an immediate termination of the outstanding bus transaction to the CPU and therefore no read data is returned to the CPU by the cache or the BIU in response to the speculative fetch. If the discard signal is asserted prior to the speculative fetch being provided by the BIU to the external bus, the cache and BIU can simply discard the request and no data will be returned by way of the external bus. Alternatively, if the discard signal is asserted after the speculative fetch has already been provided to the external bus, read data will be returned by way of the external bus to the BIU and cache in response to the speculative fetch. However, neither the BIU nor the cache provides this read data back to the CPU. Furthermore, a programmable discard fetch control register is used to determine the behavior of the cache with respect to this read data. In one case, based on the programmable discard fetch control register, the cache proceeds with a linefill in response to the speculative fetch such that the fetched instructions will be available for later use. In another case, based on the programmable discard fetch control register, the cache does not perform a linefill so as to reduce unnecessary replacement of existing cache lines.

Figure 1:
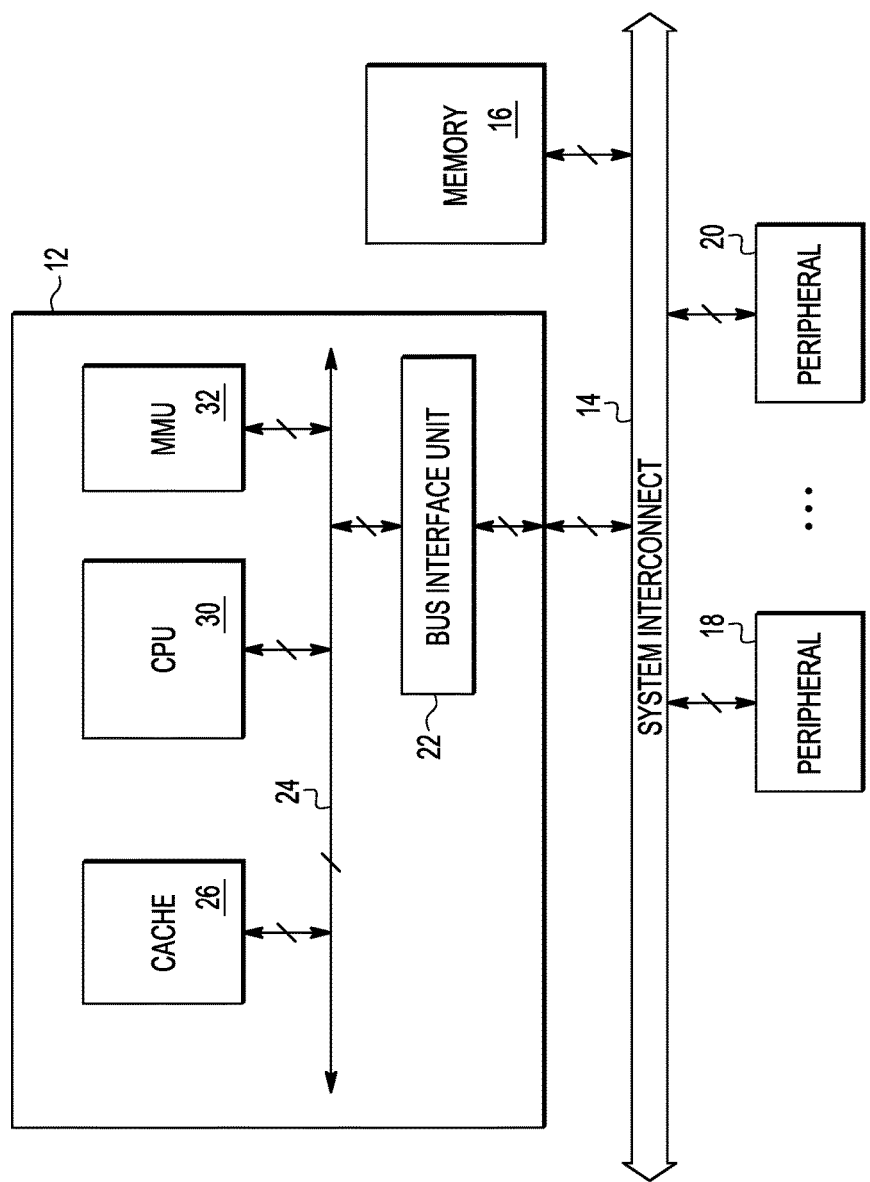
FIG. 1 illustrates, in block diagram form, a data processing system in accordance with one embodiment of the present invention.

FIG. 1 illustrates, in block diagram form, a data processing system 10. Data processing system 10 includes a processor 12, a system interconnect 14, a memory 16 and a plurality of peripherals such as a peripheral 18, a peripheral 20 and, in some embodiments, additional peripherals as indicated by the dots in FIG. 1 separating peripheral 18 from peripheral 20. Memory 16 is a system memory that is coupled to system interconnect 14 by a bidirectional conductor that, in one form, has multiple conductors. In the illustrated form each of peripherals 18 and 20 is coupled to system interconnect 14 by bidirectional multiple conductors as is processor 12. Processor 12 includes a bus interface unit (BIU) 22 that is coupled to system interconnect 14 via a bidirectional bus having multiple conductors. BIU 22 is coupled to an internal interconnect 24 via bidirectional conductors. In one embodiment, internal interconnect 24 is a multiple-conductor communication bus. Coupled to internal interconnect 24 via respective bidirectional conductors is a cache 26, a central processing unit (CPU) 30 and a memory management unit (MMU) 32. CPU 30 is a processor for implementing data processing operations. Each of cache 26, CPU 30 and MMU 32 are coupled to internal interconnect 24 via a respective input/output (I/O) port or terminal.

In operation, processor 12 functions to implement a variety of data processing functions by executing a plurality of data processing instructions. Cache 26 is a temporary data store for frequently-used information that is needed by CPU 30. Information needed by CPU 30 that is not within cache 26 is stored in memory 16. MMU 32 controls accessing of information between CPU 30 and cache 26 and memory 16. In one embodiment, cache 26 is an instruction cache used as a temporary data store for instructions fetched from memory 16. Alternate embodiments may implement cache 26 in different ways, such as a unified cache storing both instructions and data. BIU 22 provides an interface between processor 12 and system interconnect 14. BIU 22 functions to coordinate the flow of information related to instruction execution by CPU 30.

Instruction fetches by CPU 30 are provided as read requests to cache 26. Each read request has a corresponding access address. If the access address of a read request results in a hit of an entry in cache 26, cache 26 provides the instructions from the hit entry to CPU 30. However, if the access address results in a miss in cache 26, cache 26 requests the information stored at the access address from memory 16. Cache 26, in response to a cache miss, provides the read request to BIU 22 which sends the read request external to processor 12 onto system interconnect 14. Once the read request is placed onto system interconnect 14, the read request is processed by memory 16, and BIU 22 waits for the return information from memory 16. Since this requires an access by way of external interconnect 14 and memory 16, it is far slower than obtaining the information from cache 26. Once BIU 22 receives the return read information from memory 16, the return information can be provided to cache 26 and CPU 30. In one embodiment, BIU 22 provides the return information to cache 26, and cache 26 provides the return information to CPU 30.

In one embodiment, in response to a cache miss, cache 26 performs a linefill in cache 26 and thus provides the missed read request to BIU 22 as a burst read. With a burst read, a full cache line of data is requested. The requested read information is returned from memory 16 to BIU 22 as a series of beats, each beat smaller in size than the full cache line of data, if the bus width is smaller than the line size. Typically, the initial beat includes the read information for the missed read request and the remainder of the beats includes data stored before or after the access address of the missed read request. BIU 22 may collect the multiple return beats of the full burst, and provides a full cache line of data to cache 26. Cache 26 returns the read information for the missed read request to CPU 30 and allocates a new cache line entry to store the returned cache line.

In one embodiment, according to a bus protocol of system interconnect 14, once BIU 22 provides the read request onto system interconnect 14, the read request cannot be retracted. In response to the read request, the target memory of the read request (e.g. memory 16) either returns the requested read information or an error indication if an error occurs. In the case of a burst read request, the bus protocol of system interconnect 14 may allow termination of the burst read after receipt of the initial beat.

Figure 2:
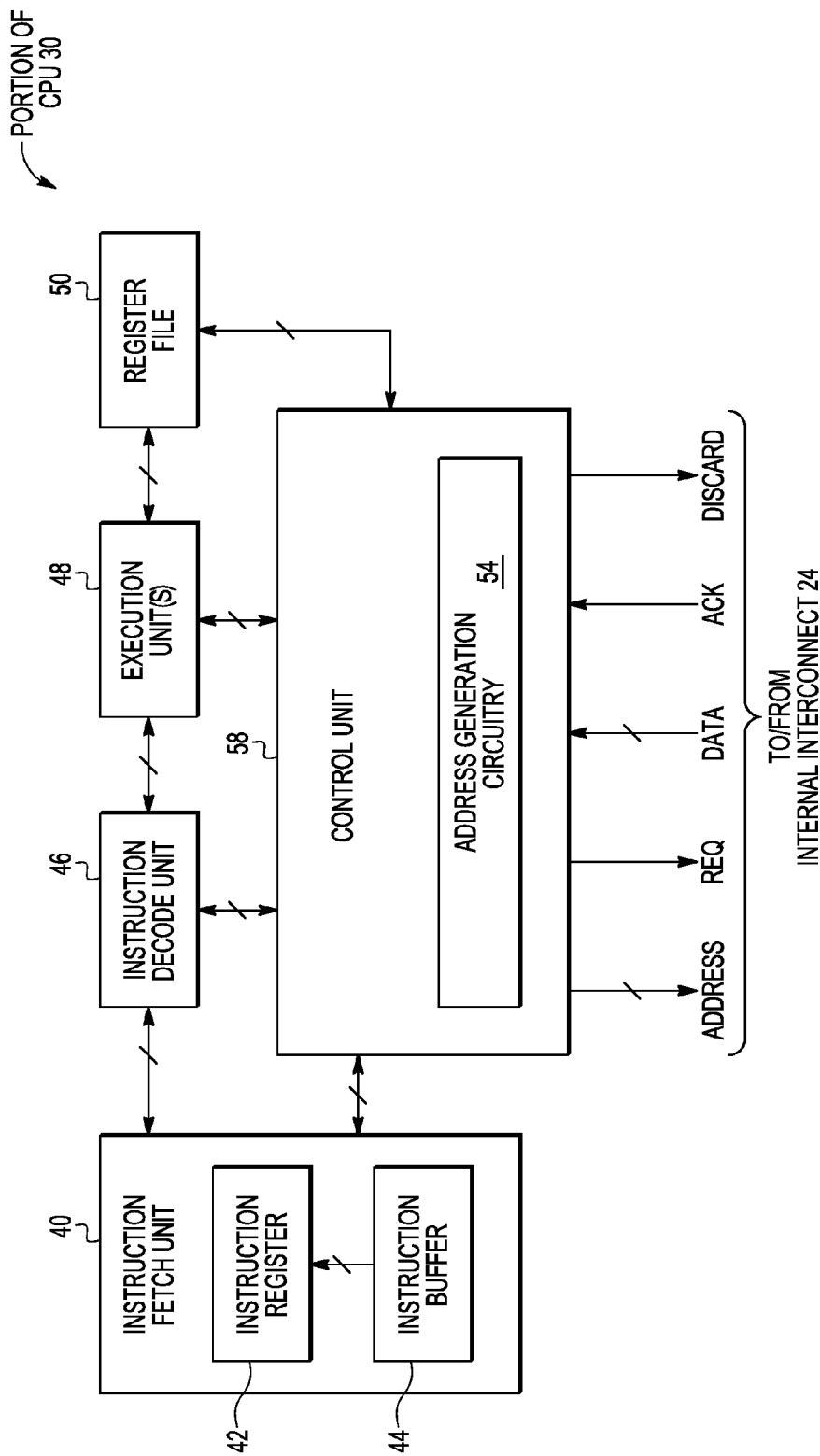
FIG. 2 illustrates, in block diagram form, a portion of a central processing unit (CPU) of the data processing system of FIG. 1 in accordance with one embodiment of the present invention.

Illustrated in FIG. 2 is a detailed portion of CPU 30 of FIG. 1 that relates to the instruction pipeline and the execution of instructions. An instruction fetch unit 40 is illustrated as including both an instruction buffer 44 and an instruction register 42. The instruction buffer 44 has an output that is connected to an input of instruction register 42. A multiple conductor bidirectional bus couples a first output of instruction fetch unit 40 to an input of an instruction decode unit 46 for decoding fetched instructions. An output of instruction decode unit 46 is coupled via a multiple conductor bidirectional bus to one or more execution unit(s) 48. The one or more execution unit(s) 48 is coupled to a register file 50 via a multiple conductor bidirectional bus. Additionally, instruction fetch unit 40, instruction decode unit 46, one or more execution unit(s) 48, and register file 50 is coupled via separate bidirectional buses to respective input/output terminals of a control unit 58 that interfaces to and from internal interconnect 24.

Control unit 58 has address generation circuitry 54 and includes a first output for providing an access address, ADDRESS, to cache 26 via internal interconnect 24, a second output for providing a request signal, REQ, to cache 26 via internal interconnect 24, a first input for receiving read data, DATA, from cache 26 or BIU 22 via internal interconnect 24, a second input for receiving an ACK signal from cache 26 via internal interconnect 24, and a third output for providing a DISCARD signal to cache 26 and BIU 22 via internal interconnect 24. In one embodiment, the DISCARD signal is a single bit output. Alternatively, it is a multiple bit output with one bit for each of the number of outstanding transactions allowed on internal interconnect 24. Other data and control signals can be communicated via single or multiple conductors between control unit 58 and internal interconnect 24 for implementing data processing instruction execution, as required.

In the illustrated form of this portion of CPU 30, control unit 58 controls instruction fetch unit 40 which is configured to store fetched instructions in instruction buffer 44, in which a next instruction for execution in instruction register 42 is provided to instruction decode unit 46. Instruction decode unit 46 performs instruction decoding for one or more execution unit(s) 48. Register file 50 is used to support one or more execution unit(s) 48. Note that instruction fetch unit 40, instruction decode unit 46, execution units 48 and associated control unit 58 and register file 50 implement an instruction pipeline of CPU 30. Therefore, the instruction pipeline of CPU 30 provides ADDRESS, REQ, and DISCARD, and receives DATA and ACK. Within control unit 58 is address generation circuitry 54. Address generation circuitry 54 generates access addresses for read requests to implement instruction fetching. The read requests are first provided to cache 26, which responds to the read request as described above. That is, in response to a cache hit, cache 26 provides the read information to CPU 30 and in response to a cache miss, cache 26 obtains the read information from external memory 16 via system interconnect 14.

Address generation circuitry 54 generates a next access address to fetch a next instruction to be provided to the pipeline for execution. If an access address corresponds to a branch instruction, there are two possible paths of instruction execution: a taken path if the branch instruction is taken and a non-taken path if the branch instruction is not taken. In one embodiment, when an instruction is within instruction decode unit 46, it is determined whether the instruction is a branch instruction or not. At this point, the branch instruction can be predicted as not taken in which address generation circuitry 54 continues speculatively fetching instructions in sequential order from the branch instruction. However, the branch instruction is not resolved as taken or not taken until later in the pipeline, such as during execution by execution unit(s) 48. If the branch instruction is resolved as taken, then the speculatively fetched instruction stream is incorrect and instruction fetching needs to begin at the target access address of the resolved branch instruction. This results in pipeline stalls as the pipeline is corrected to fetch the new instruction stream.

Furthermore, as known in the art, a branch target buffer (BTB) can be used to store recently accessed branch instructions such that if an instruction access address hits in the BTB, it is assumed to be a branch instruction, and it can be predicted to be taken or not taken. If predicted taken, the hit entry of the BTB also provides a target access address from which to speculatively continue fetching. The BTB is accessed early in the instruction pipeline, when each access address is initially generated by address generation circuitry, which occurs prior to an instruction reaching instruction decode unit 46. The instruction is first verified as an actual branch instruction by instruction decode unit 46, and, if it is a branch instruction, the branch instruction is resolved during execution by execution unit(s) 48. If either the instruction is not verified as a branch instruction or the branch instruction is resolved as mispredicted, the speculatively fetched instruction stream is incorrect. As a result, pipeline stalls occurs as the instruction stream is corrected. While a BTB offers improved performance for frequently accessed branch instructions and for branches which are correctly predicted, greater pipeline stalls may be caused in the case of a misprediction.

Regardless of whether a BTB is used or not, speculative fetches, once deemed incorrect, creates stalls in the pipeline. Furthermore, if any of these speculative fetches missed in cache 26, greater pipeline stalls are experienced due to the fetches being provided external to system interconnect 14. Therefore, in one embodiment, upon the determination that a speculative fetch has been mispredicted and thus is no longer needed due, for example, to a branch misprediction, control unit 58 within CPU 30 asserts the discard signal which is provided to cache 26 and BIU 22. For example, during the execution phase of the pipeline, it may be determined by execution unit(s) 48 that the current speculative instruction stream is incorrect. In this case, execution unit(s) 48 provides an indication of such to control unit 58 which asserts the discard signal. Assertion of the discard signal results in an immediate termination of an outstanding bus transaction from CPU 30 on internal interconnect 24, thus discarding speculative fetches which are no longer needed. In one embodiment, more than one outstanding transaction may be allowed on internal interconnect 24. In this embodiment, separate DISCARD signals may exist for each outstanding transaction such that any or all of the outstanding transactions may be discarded.

If the discard signal is asserted early enough, such as prior to cache 26 providing the speculative read request to system interconnect 14 via BIU 22 in response to a cache miss of the speculative read request, cache 26 or BIU 22 simply discards the read request and does nothing further with it. In this case, the cache miss of the speculative read request is not further processed by cache 26. Also, since the read request never made it to system interconnect 14, no read information is expected by BIU 22 or cache 26. However, if the discard signal is not asserted early enough and the read request has already been provided to system interconnect 14 in response to a cache miss, then read information is expected to be returned to BIU 22. A programmable discard fetch control register is used to determine the behavior of cache 26 with respect to the returned read information for the discarded fetch.

Figure 3:
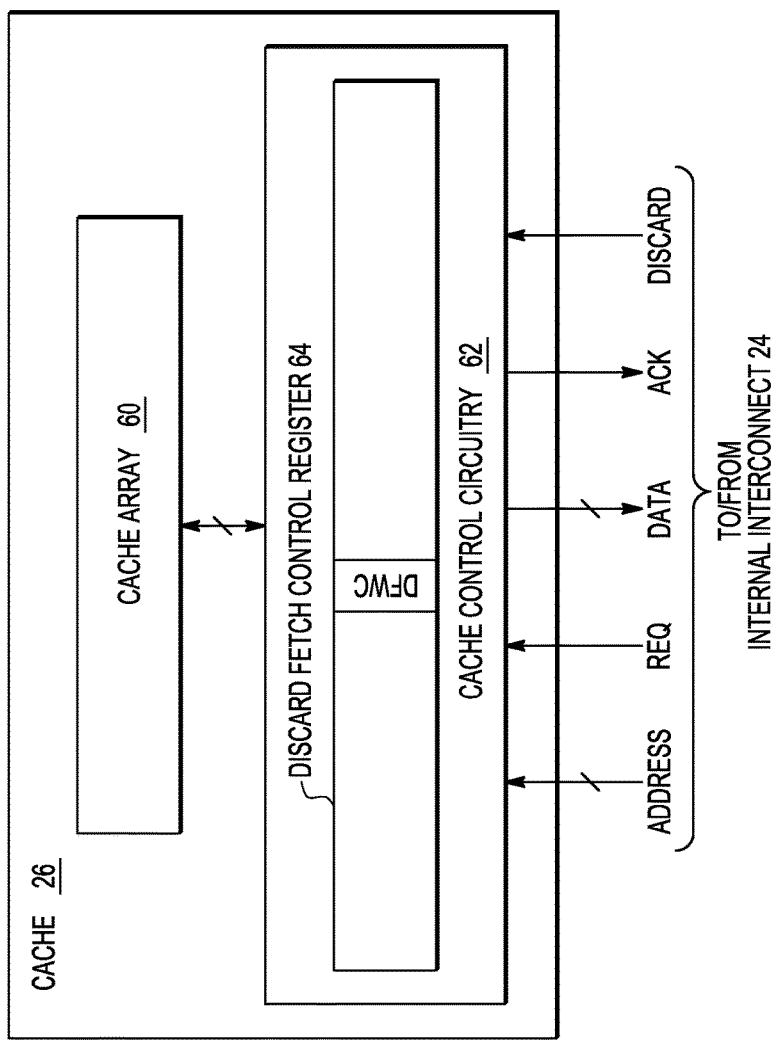
FIG. 3 illustrates in block diagram form a portion of the cache of FIG. 1 in accordance with one embodiment of the present invention.

FIG. 3 illustrates, in block diagram form, cache 26 including a cache array 60 which includes a number of cache entries, and cache control circuitry 62 coupled to cache array 60. Cache control circuitry 62 receives read requests from CPU 30 (by receiving REQ and ADDRESS from CPU 30). Cache control circuitry 62 determines whether a read request hits or misses in cache array 60. In the case of a cache hit, cache control circuitry 62 provides the appropriate information from the cache hit entry back to CPU 30. In the case of a cache miss, cache control circuitry 62 sends the read request to memory 16. When cache 26 provides the read information to CPU 30, whether in response to a cache hit or after a cache miss, cache control circuitry 62 asserts ACK which is provided to CPU 30. Cache control circuitry 62 also receives the discard signal from CPU 30. Operation of cache 26 with respect to the discard signal will be described in more detail to FIG. 5 below.

Cache control circuitry 62 includes a discard fetch control register 64 which stores a discard fetch warm cache (DFWC) indicator. In one embodiment, the DFWC indicator is a single control bit which may either be asserted or negated. The DFWC indicator indicates what is done with the read information returned from discarded fetches which are already pending on system interconnect 14, external to CPU 30. In one embodiment, when asserted (e.g. a logic level one), cache control circuitry 62 warms the cache by storing the read information returned by the discarded speculative fetch into cache array 60. In this case, cache 26 proceeds with a linefill in response to the speculative fetch, even though the speculative fetch was determined by the instruction pipeline of CPU 30 to no longer be needed. The linefill may be implemented as a burst read request, as described above. Also, cache control circuitry 62 may use any cache allocation policy to determine which entry in the cache array to replace with the linefill. When DFWC is negated (e.g. a logic level 0), cache control circuitry 62 does not store the read information returned by the discarded speculative fetch into cache array 60. In this manner, no entry in cache array 60 is replaced. In this case, cache 26 does not perform a linefill in which the initial beat returned of the burst read request is discarded and either all subsequent beats of the burst read request are discarded or, if allowed by the bus protocol of system interconnect 14, subsequent beats are terminated and thus never sent to memory 16.

Use of the DFWC indicator allows improved flexibility for allocation in cache 26. If, for example, a high percentage of discarded fetches will be used in the future, then asserting the DFWC indicator allows for the read information returned in response to the discarded fetch to be allocated into cache 26 for later use. However, if a low percentage of discarded fetches will be used in the future, then negating the DFWC indicator allows for reduced unnecessary thrashing or replacing of needed cache lines.

Figure 4:
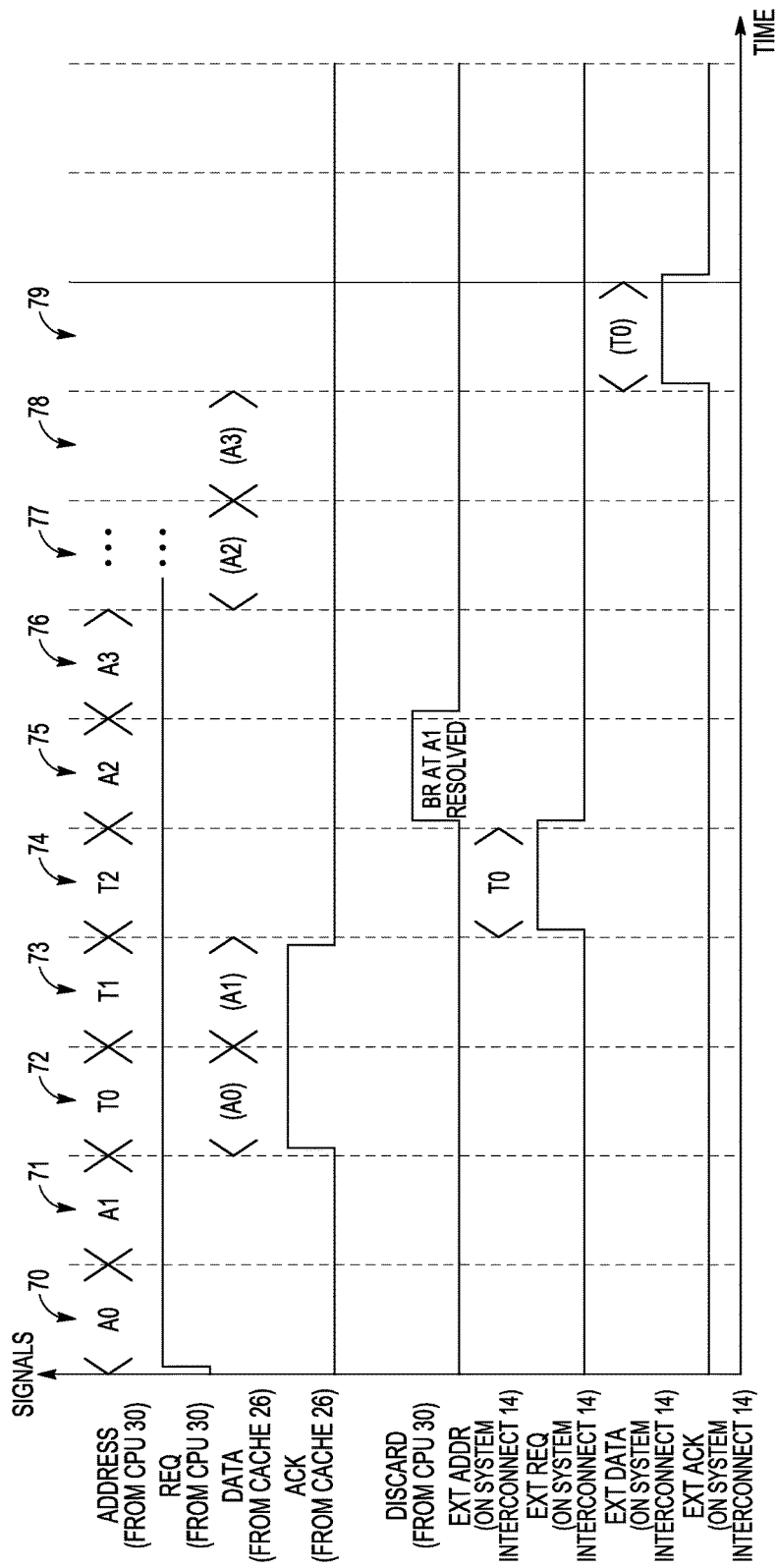
FIG. 4 illustrates, in timing diagram form, various signals of the data processing system of FIG. 1 in accordance with one embodiment of the present invention.

FIG. 4 illustrates, in timing diagram form, various signals of data processing system 10, including ADDRESS from CPU 30 on internal interconnect 24, REQ from CPU 30 on internal interconnect 24, DATA from cache 26 on internal interconnect 24, ACK from cache 26 on internal interconnect 24, DISCARD from CPU 30 on internal interconnect 24, EXT ADDR on system interconnect 14, EXT REQ on system interconnect 14, EXT DATA on system interconnect 14, and EXT ACK on system interconnect 14. EXT REQ corresponds to the read request which is provided by BIU 22 onto system interconnect 14, and EXT ADDR corresponds to the corresponding access address of the read request which is provided by BIU 22 onto system interconnect 14. EXT DATA corresponds to the read information returned by memory 16 to cache 26 via BIU 22 and EXT ACK corresponds to the acknowledge signal from memory 16 provided with EXT DATA to cache 26 via BIU 22. FIG. 4 illustrates these signals in accordance with an example illustrating operation of data processing system 10 over a number of clock cycles corresponding to clock cycles 70-79. (Note that the clock signal itself is not illustrated.)

In the illustrated example of FIG. 4, it is assumed that there can be two outstanding transactions on internal interconnect 24. Therefore, in cycles 70 and 71, control unit 58 places access addresses A0 and A1 onto internal interconnect 24. These are provided to cache 26 from CPU 30. Also, control unit 58 asserts REQ to indicate to cache 26 that requests are being provided. It is assumed that each of access address A0 and A1 hit in cache 26, therefore in the subsequent cycles 72 and 73, the read information corresponding to A0, denoted as (A0), and A1, denoted as (A1), are returned from cache 26 to control unit 58 as DATA. Also, cache 26 asserts ACK when read information is provided on internal interconnect 24 back to CPU 30. In the illustrated example, it is assumed that access address A1 corresponds to a change of flow instruction (such as a branch instruction) such that instruction fetching proceeds with the branch target access address T0 which is not sequential to access address A1. The fetches beginning at access address T0 are speculative fetches until it is known whether the branch instruction at A1 is resolved as taken. The resolution of the branch instruction at A1, though, does not occur until later in the pipeline, in cycle 75.

Since the branch instruction at A1 is predicted as taken, control unit 58 provides access addresses T0 and T1 to cache 26 in cycles 72 and 73. It is assumed that access address T0, unlike access addresses A0 and A1, misses in cache 26. Therefore, in cycle 74, BIU 22 provides access address T0 as EXT ADDR onto system interconnect 14 to be processed by memory 16. The read information, denoted as (T0), in response to access address T0 is not returned onto system interconnect 14 until much later, in cycle 79. This is due to the delay required for external memory 16 to perform the read access. Also, EXT ACK is also asserted in cycle 79 on system interconnect 14.

However, in the illustrated example, it is assumed that in cycle 75, the branch instruction at A1 is resolved as not taken by the instruction pipeline. Therefore, the branch instruction at address A1 was mispredicted and the speculative read request of T0 was mispredicted. In this case, instruction fetching should have proceeded with the next sequential address, A2, and not the branch target address T0. Therefore, the instruction stream of access addresses T0, T1, and T2 is incorrect and these speculative fetches were mispredicted and thus are not needed. In response to the branch instruction at A1 being resolved as mispredicted, control unit 58 asserts the discard signal, DISCARD. Assertion of the discard signal immediately terminates mispredicted accesses T0 and T1 and therefore allows instruction fetching in cycle 75 to begin with the correct access address A2 following the resolved branch instruction at A1. Note access address T2 had not been taken on internal interconnect 24 yet as this interconnect, in the current embodiment, only allows for two outstanding transactions. It is assumed that A2 and A3 hit in cache 26, and the read information corresponding to A2 and A3, denoted as (A2) and (A3), is returned in cycles 77 and 78.

The assertion of the discard signal in cycle 75 allows control unit 58 (i.e. allows the instruction pipeline of CPU 30) to immediately begin fetching instructions at the correct access address A2 and continue executing instructions with the correct instruction at access address A2. In prior art systems that do not include the discard signal, CPU 30 could not begin fetching instructions at A2 until the access at T0 is completed and the EXT ACK signal is received by BIU 22. This is because CPUs in prior art systems did not have a way to indicate to the cache that it no longer expected a response for a read request. Therefore, in such a system, the CPU would not begin fetching instructions of the correct instruction stream at A2 until after a response is received (either an acknowledge or an error) from system interconnect 14, which does not occur until cycle 79. However, in the illustrated example, the discard signal provided to cache 26 and BIU 22 allows CPU 30 to terminate the unnecessary fetches and immediately continue with fetching the correct instruction stream. This can result in improved CPU performance with reduced pipeline stalls.

Although CPU 30 may be allowed to continue processing at A2 in cycle 75 with the assertion of the discard signal, the read access to T0 is still pending on system interconnect 14. In one embodiment, the bus protocol of system interconnect 14 requires that the read access continue even though CPU 30 is no longer expecting a response to the read access. However, the read access to T0 continues in the background as CPU 30 continues fetching and executing instructions in the correct instruction stream. In cycle 79, the corresponding read information, denoted as (T0), corresponding to access address T0 is returned to BIU 22 and cache 26, and EXT ACK on system interconnect 14 is asserted.

With cache 26 and BIU 22 receiving the asserted discard signal, neither cache 26 nor BIU 22 provides the read information, (T0), to CPU 30 because CPU 30 terminated the speculative fetch at T0. Furthermore, cache 26 determines what is done with the read information, (T0), based upon DFWC in control register 64. In this manner, by controlling the value of DFWC, software can control what is done as a result of the termination of unneeded speculative fetches by CPU 30. If DFWC is asserted, cache 26 stores (T0) into cache array 60. If (T0) is a first data beat of a burst read, BIU 22 or cache 26 waits for all data beats of the burst access and allocates an entry in cache array 60 for the full burst read information. If DFWC is negated, cache 26 discards (T0) and stores nothing into cache array 60. If (T0) is an initial data beat of a burst read, and the protocol of system interconnect 14 allows it, cache 26 or BIU 22 can terminate subsequent beats. Alternatively, BIU 22 or cache 26 may receive the subsequent beats but they would also be discarded and not stored into cache array 60. Note that regardless of the value of DFWC or how the terminated speculative fetch at T0 is being handled by cache 26, CPU 30, upon asserting the discard signal, can continue processing, fetching, and executing instructions while the terminated speculative fetch is being handled in the background.

Figure 5:
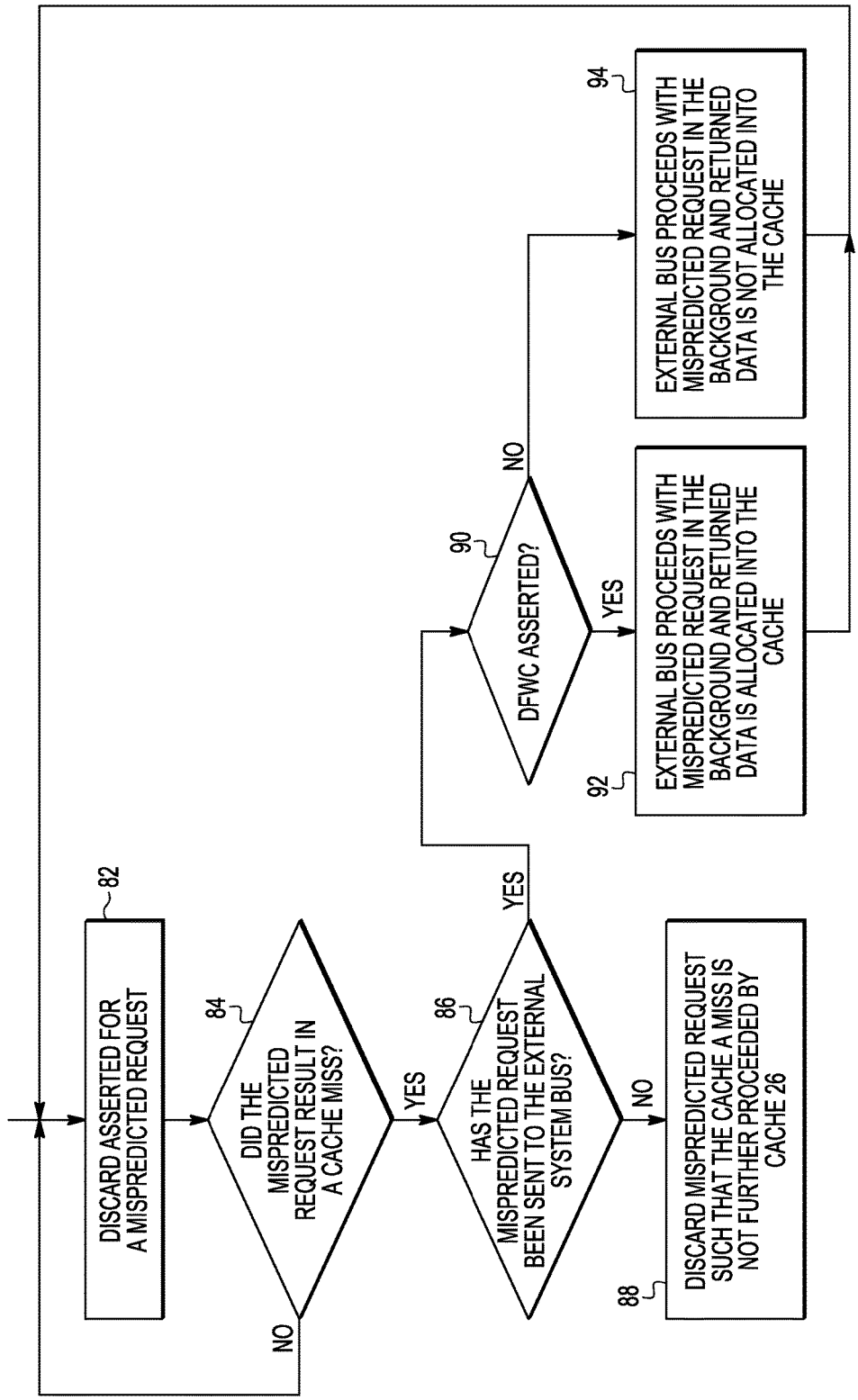
FIG. 5 illustrates, in flow diagram form, a method of process an asserted discard indicator, in accordance with one embodiment of the present invention.

FIG. 5 illustrates, in flow diagram form, a method 80 is performed by cache 26 in response to an asserted discard signal, in accordance with one embodiment of the present invention. Method 80 begins with block 82 in which cache 26 receives an asserted discard signal for a mispredicted read request. As described above, the asserted discard signal is provided by CPU 30, such as by the instruction pipeline of CPU 30. A mispredicted read access may occur when a branch instruction is predicted taken and is later resolved as not taken or when a branch instruction was predicted not taken and is later resolved as taken. In the example of FIG. 4, the mispredicted read request corresponds to the read request corresponding to access address T0 which was mispredicted because the branch at A1 was mispredicted as taken. Method 80 then proceeds to decision diamond 84 in which it is determined whether the mispredicted request resulted in a cache miss. If not, then a cache hit occurred. However, cache 26 does not provide the read information from the hit entry to CPU 30 since the discard signal is asserted. If, at decision diamond 84, the mispredicted request resulted in a cache miss, it is determined, at decision diamond 86, whether the mispredicted request has been sent to the external system bus. If not, then the mispredicted request is discarded such that the cache miss is not further processed by cache 26.

If, at decision diamond 86, the mispredicted request has been sent to the external system bus (as in the example of FIG. 4 in which T0 was on system interconnect 14 at the time the discard signal was asserted by CPU 30), it is determined, at decision diamond 90, whether DFWC is asserted. If so, the external bus proceeds processing the mispredicted request in the background and the returned data (e.g. (T0)) is allocated into cache 26. If not, the external bus proceeds processing the mispredicted request in the background and the returned data is not allocated into cache 26. Therefore, in either case, due to the bus protocol of the external bus (such as external interconnect 14), the request is still processed, such as by memory 16, and read information still returned for the mispredicted request. However, this further processing on the external bus occurs in the background to CPU 30. That is, CPU 30, upon asserting the discard signal, immediately continues with fetching and executing instructions in the correct instruction stream without waiting for the processing of the mispredicted read request to complete (e.g. prior to read information being returned for the mispredicted request). For example, after asserting the discard signal, CPU 30 can generate a correct read request for a next instruction following the mispredicted change of flow (COF) instruction. In the case of the COF instruction being mispredicted as taken, the correct read request for the next instruction following the mispredicted COF instruction corresponds to the instruction at the address sequential to the address of the COF instruction, and in the case of the COF instruction being mispredicted as not taken, the correct read request corresponds to the instruction located at the target address of the COF instruction. In this manner, performance may be improved since CPU 30 can continue filling its pipeline and execute instructions even though the mispredicted request on system interconnect 14 cannot be stopped.

Also, upon asserting the discard signal, just as CPU 30 continues fetching and executing instructions in the correct instruction stream without waiting for the processing of the mispredicted read request to complete, cache 26 also continues processing new requests from CPU 30 for the correct instruction stream. That is, upon assertion of the discard signal, cache 26 continues accepting new read requests of the correct instruction stream from CPU 30 and can terminate those new read requests which hit in the cache, even while the mispredicted read request is being processed on system interconnect 14. In this manner, performance of cache 26 may also be improved even though the mispredicted request on system interconnect cannot be stopped.

Therefore, by now it can be appreciated that there has been provided a mechanism for improved speculative fetching performance by allowing the CPU or processor within a system to terminate itself when a speculative fetch (read request) is determined to be mispredicted and thus unneeded. For example, through the assertion of a discard signal by the CPU or processor which is provided to the cache, the CPU or processor alerts the cache that it no longer is expecting a response to the unneeded read request. Although the unneeded read request may still provide return data on the external bus if it was not terminated prior to being placed on the external bus, the CPU or processor can immediately continue fetching at the correct access address. Furthermore, the DFWC control bit can be programmed for use by the cache to determine what is to be done with the read information that is returned by way of the external bus for the unneeded read request. This allows for improved flexibility for cache allocation.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals. For example, rather than buses, each of internal and external interconnects 24 and 14 may be implemented as interconnect fabrics or switches.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, a hardware mechanism rather than software may be used within CPU 30 or cache control circuitry 62 to control the value of the DFCW bit. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In one embodiment, a data processing system includes an instruction pipeline configured to assert a discard signal when a speculative read request is determined to have been mispredicted, the speculative read request having a corresponding access address; a bus interface unit, coupled to the instruction pipeline, and configured to communicate with an external system interconnect; and a cache, coupled to the instruction pipeline and bus interface unit. The cache has a cache array and cache control circuitry, wherein the cache control circuitry is configured to receive the discard signal from the instruction pipeline and, when the discard signal is asserted after the access address has been provided to the external system interconnect by the bus interface unit in response to a determination by the cache control circuitry that the access address missed in the cache array, selectively store the read information returned from the access address into the cache array. In one aspect, the cache control circuitry is configured to, when the discard signal is asserted and the access address has not yet been provided to the external system interconnect by the bus interface unit, discard the access address and not further process the cache miss. In another aspect, the cache control circuitry further comprises storage circuitry configured to store a discard fetch cache warm (DFCW) indicator which indicates to the cache control circuitry whether or not the read information returned from the access address is stored in the cache array. In a further aspect, the cache control circuitry is configured to, when the DFCW indicator has a first value and the discard signal is asserted, allocate an entry in the cache array to store the returned read information. In yet a further aspect, the cache control circuitry is configured to, when the access address misses in the cache array, perform a cache linefill, wherein the cache linefill includes the returned read information. In yet an even further aspect, the bus interface unit is configured to provide a burst read request to the external system interconnect to perform the cache linefill. In another aspect, the cache control circuitry is further configured to, when the DFCW indicator has a second value and the discard signal is asserted, not allocate an entry in the cache array to store the returned read information. In a further aspect, the bus interface unit is configured to, when DFCW has the second value, the discard signal is asserted, and the returned read information is an initial beat of a burst read performed in response to the access address missing in the cache array, terminate subsequent beats of the burst read. In yet another aspect of the above embodiment, the instruction pipeline is configured to generate the speculative read request in response to predicting an outcome of a change of flow instruction and configured to determine that the speculative read request has been mispredicted in response to resolving the change of flow instruction. In a further aspect, the instruction pipeline is configured to, after asserting the discard signal when the speculative read request is determined to have been mispredicted, generate a correct read request for a next instruction following the change of flow instruction, wherein the correct read request is generated by the instruction pipeline prior to the read information being returned on the external system interconnect.

In another embodiment, a method, in a data processing system, includes receiving, by a cache from an instruction pipeline, an asserted discard signal indicating that a speculative read request, having a corresponding access address, is mispredicted; in response to receiving the asserted discard signal, determining whether the access address has been provided to an external system interconnect to obtain read information stored at the access address in response to a cache miss in the cache; and if the access address has been provided to the external system bus in response to the cache miss, selectively allocating an entry in the cache for the read information and not returning the read information to the instruction pipeline in response to the speculative read request. In one aspect, if the access address has not been provided to the external system bus, discarding, by the cache, the speculative read request and not further processing the cache miss. In another aspect, if the access address has been provided to the external system bus in response to the cache miss, the selectively allocating the entry in the cache for the read information includes: if a discard fetch warm cache (DFWC) indicator has a first value, allocating an entry in the cache for the read information; and if the DFWC indicator has a second value, not allocating an entry in the cache for the read information. In another aspect, the method further includes generating, by the instruction pipeline, the speculative read request in response to predicting whether a branch instruction is taken or not taken; and asserting, by the instruction pipeline, the discard signal to indicate that the speculative read request is mispredicted in response to resolving the branch instruction as mispredicted. In a further aspect, after asserting the discard signal, the method further includes generating, by the instruction pipeline, a read request for a next instruction following the resolved branch instruction, wherein the selectively allocating an entry in the cache for the read information occurs in the background while the instruction pipeline generates the read request for the next instruction and continues instruction execution with the next instruction. In another aspect, the method further includes determining that the access address results in a cache miss; and generating a burst read request for a cache line fill, wherein the read information is an initial beat returned for the burst read request, wherein if the DFWC has a first value, the entry is allocated for the cache line fill, and if the DFWC has a second value, terminating the burst read request after the initial beat is returned and not allocating an entry in the cache for the initial beat.

In yet another embodiment, a data processing system includes an instruction pipeline configured to assert a discard signal when a speculative read request is determined to have been mispredicted, the speculative read request having a corresponding access address; a bus interface unit, coupled to the instruction pipeline, and configured to communicate with an external system interconnect; and a cache, coupled to the instruction pipeline and bus interface unit. The cache has a cache array and cache control circuitry, wherein the cache control circuitry is configured to receive the discard signal from the instruction pipeline and store a discard fetch cache warm (DFCW) indicator which indicates to the cache control circuitry whether or not read information returned from the access address is allocated into the cache array when the discard signal has been asserted after the bus interface unit has provided the access address to the external system interconnect in response to the access address missing in the cache array. In one aspect, the cache control circuitry is configured to, when the discard signal is asserted and the access address has not yet been provided to the external system interconnect by the bus interface unit, discard the access address and not further process the cache miss. In another aspect, the cache control circuitry is configured to, when the DFCW indicator has a first value and the discard signal is asserted, allocate an entry in the cache array to store the returned read information, and when the DFCW indicator has a second value and the discard signal is asserted, not allocate an entry in the cache array to store the returned read information. In yet another aspect, the instruction pipeline is configured to, after asserting the discard signal when the speculative read request is determined to have been mispredicted, generate a correct read request for a next instruction following the change of flow instruction, wherein the correct read request is generated by the instruction pipeline prior to the read information being returned on the external system interconnect, and wherein the cache is configured to process the correct read request from the instruction pipeline prior to the read information being returned on the external system interconnect.

What is claimed is:

1. A data processing system, comprising:
   an instruction pipeline configured to assert a discard signal when a speculative instruction fetch is determined to have been mispredicted, the speculative instruction fetch having a corresponding access address, wherein the instruction pipeline is configured to generate the speculative instruction fetch in response to predicting an outcome of a change of flow instruction and configured to determine that the speculative instruction fetch has been mispredicted in response to resolving the change of flow instruction;
   a bus interface unit, coupled to the instruction pipeline, and configured to communicate with an external system interconnect;
   a cache, coupled to the instruction pipeline and bus interface unit and having a cache array and cache control circuitry, wherein the cache control circuitry is configured to receive the discard signal from the instruction pipeline and, when the discard signal is asserted after the access address has been provided to the external system interconnect by the bus interface unit in response to a determination by the cache control circuitry that the access address missed in the cache array, selectively store read information returned from the access address into the cache array in which the read information includes an instruction that belongs to an incorrect instruction stream.

2. The data processing system of claim 1, wherein the cache control circuitry is configured to, when the discard signal is asserted and the access address has not yet been provided to the external system interconnect by the bus interface unit, discard the access address and not further process the cache miss.

3. The data processing system of claim 1, wherein the cache control circuitry further comprises storage circuitry configured to store a discard fetch cache warm (DFCW) indicator which indicates to the cache control circuitry whether or not the read information returned from the access address is stored in the cache array.

4. The data processing system of claim 3, wherein the cache control circuitry is configured to, when the DFCW indicator has a first value and the discard signal is asserted, allocate an entry in the cache array to store the returned read information.

5. The data processing system of claim 4, wherein the cache control circuitry is configured to, when the access address misses in the cache array, perform a cache linefill, wherein the cache linefill includes the returned read information.

6. The data processing system of claim 5, wherein the bus interface unit is configured to provide a burst read request to the external system interconnect to perform the cache linefill.

7. The data processing system of claim 3, wherein the cache control circuitry is further configured to, when the DFCW indicator has a second value and the discard signal is asserted, not allocate an entry in the cache array to store the returned read information.

8. The data processing system of claim 7, wherein the bus interface unit is configured to, when DFCW has the second value, the discard signal is asserted, and the returned read information is an initial beat of a burst read performed in response to the access address missing in the cache array, terminate subsequent beats of the burst read.

9. The data processing system of claim 1, wherein the cache control circuitry is configured to, when the discard signal is asserted after the access address has been provided to the external system interconnect by the bus interface unit in response to a determination by the cache control circuitry that the access address missed in the cache array, not return the read information to the instruction pipeline.

10. The data processing system of claim 1, wherein the instruction pipeline is configured to, after asserting the discard signal when the speculative instruction fetch is determined to have been mispredicted, generate a correct instruction fetch for a next instruction following the change of flow instruction, wherein the correct instruction fetch is generated by the instruction pipeline prior to the read information being returned on the external system interconnect.

11. In a data processing system, a method comprising:
    generating, by an instruction pipeline, a speculative instruction fetch, having a corresponding access address, in response to predicting whether a branch instruction is taken or not taken; and
    asserting, by the instruction pipeline, a discard signal to indicate that the speculative instruction fetch is mispredicted in response to resolving the branch instruction as mispredicted;
    receiving, by a cache from the instruction pipeline, the asserted discard signal;
    in response to receiving the asserted discard signal, determining whether the access address has been provided to an external system interconnect to obtain read information stored at the access address in response to a cache miss in the cache; and
    if the access address has been provided to the external system bus in response to the cache miss, selectively allocating an entry in the cache for the read information and not returning the read information to the instruction pipeline in response to the speculative instruction fetch, wherein the read information includes an instruction that belongs to an incorrect instruction stream.

12. The method of claim 11, wherein if the access address has not been provided to the external system bus, discarding, by the cache, the speculative read request and not further processing the cache miss.

13. The method of claim 11, wherein if the access address has been provided to the external system bus in response to the cache miss, the selectively allocating the entry in the cache for the read information comprises:

if a discard fetch warm cache (DFWC) indicator has a first value, allocating an entry in the cache for the read information; and if the DFWC indicator has a second value, not allocating an entry in the cache for the read information.

14. The method of claim 11, wherein after asserting the discard signal, the method further comprises:

generating, by the instruction pipeline, an instruction fetch for a next instruction following the resolved branch instruction, wherein the selectively allocating an entry in the cache for the read information occurs in the background while the instruction pipeline generates the instruction fetch for the next instruction and continues instruction execution with the next instruction.

15. The method of claim 13, further comprising:

determining that the access address results in a cache miss; and generating a burst read request for a cache line fill, wherein the read information is an initial beat returned for the burst read request, wherein if the DFWC has a first value, the entry is allocated for the cache line fill, and if the DFWC has a second value, terminating the burst read request after the initial beat is returned and not allocating an entry in the cache for the initial beat.

16. A data processing system, comprising:

an instruction pipeline configured to assert a discard signal when a speculative instruction fetch is determined to have been mispredicted, the speculative instruction fetch having a corresponding access address, wherein the instruction pipeline is configured to generate the speculative instruction fetch in response to predicting an outcome of a change of flow instruction and configured to determine that the speculative instruction fetch has been mispredicted in response to resolving the change of flow instruction;

a bus interface unit, coupled to the instruction pipeline, and configured to communicate with an external system interconnect;

a cache, coupled to the instruction pipeline and bus interface unit having a cache array and cache control circuitry, wherein the cache control circuitry is configured to receive the discard signal from the instruction pipeline and store a discard fetch cache warm (DFCW) indicator which indicates to the cache control circuitry whether or not read information returned from the access address is allocated into the cache array when the discard signal has been asserted after the bus interface unit has provided the access address to the external system interconnect in response to the access address missing in the cache array.

17. The data processing system of claim 16, wherein the cache control circuitry is configured to, when the discard signal is asserted and the access address has not yet been provided to the external system interconnect by the bus interface unit, discard the access address and not further process the cache miss.

18. The data processing system of claim 16, wherein the cache control circuitry is configured to, when the DFCW indicator has a first value and the discard signal is asserted, allocate an entry in the cache array to store the returned read information, and when the DFCW indicator has a second value and the discard signal is asserted, not allocate an entry in the cache array to store the returned read information.

19. The data processing system of claim 16, wherein:

the instruction pipeline is configured to, after asserting the discard signal when the speculative instruction fetch is determined to have been mispredicted, generate a correct instruction fetch for a next instruction following the change of flow instruction, wherein the correct instruction fetch is generated by the instruction pipeline prior to the read information being returned on the external system interconnect, and wherein the cache is configured to process the correct read request from the instruction pipeline prior to the read information being returned on the external system interconnect.

* * * * *